United States Patent [19]

Kessl

[11] 4,171,219

[45] Oct. 16, 1979

[54] USE OF SILICON CARBIDE AS AN ADDITION TO CUPOLA FURNACES

[76] Inventor: Werner Kessl, 8481 Bärnwinkel Nr. 10a, Fed. Rep. of Germany

[21] Appl. No.: 916,744

[22] Filed: Jun. 19, 1978

[30] Foreign Application Priority Data

Jun. 21, 1977 [DE] Fed. Rep. of Germany ....... 2727896

[51] Int. Cl.$^2$ ............................................. C22C 33/08
[52] U.S. Cl. .................................... 75/130 R; 75/129; 75/130 A; 75/130 AB
[58] Field of Search .......... 75/130 R, 130 A, 130 AB, 75/129

[56] References Cited

U.S. PATENT DOCUMENTS

| | | | |
|---|---|---|---|
| 2,119,521 | 6/1938 | Brown | 75/129 |
| 3,051,564 | 8/1962 | Drenning | 75/130 R |
| 3,214,267 | 10/1965 | Stephens | 75/130 R |

*Primary Examiner*—P. D. Rosenberg

*Attorney, Agent, or Firm*—Toren, McGeady and Stanger

[57] ABSTRACT

A method for the direct siliconization of cast iron wherein the charge contains a high percentage of steel scrap by adding to the charge pressed pieces of silicon carbide containing 45–55% by weight SiC, 25–35% by weight Al$_2$O$_3$, SiO$_2$ and CaO (including cement as a binding agent in amounts of 10–25% by weight), having the following portions, computed as oxides:
2–30% by weight Al$_2$O$_3$,
7–30% by weight SiO$_2$,
5–25% by weight CaO,
5–25% by weight graphite, with the remainder being crystalline water and the usual impurities.

The present process provides improved and more reliable control of the silicon yield and properties of the cast iron.

2 Claims, No Drawings ic carbide used in the present invention should mainly

USE OF SILICON CARBIDE AS AN ADDITION TO CUPOLA FURNACES

BACKGROUND OF THE INVENTION

1. Field of the Invention

This invention pertains to the field of direct siliconization of cast iron in cupola furnaces.

2. Description of the Prior Art

It is known that there are significant difficulties in the direct siliconization of cast iron in a cupola furnace when using charges containing a high percentage of steel scrap. Most often, significant silicon oxidation must be accepted. In this regard, aside from the economical disadvantages, it is especially inconvenient that the silicon oxidation also varies to a large extent. Therefore, a direct reproducible siliconization is almost impossible.

In the 1930's, it was attempted to add silicon carbide to conventional cast iron melts in the cupola furnace to influence the melt and the properties of the cast iron (see U.S. Pat. No. 2,119,521; Giesserei, 1962, 368, 376) but the results varied. In the second half of the 1960's, success was obtained in making available molded pieces of silicon carbide which made it possible to directly influence the composition, the melting procedure and the properties of the cast iron (German patent No. 1,583,262).

However, in the use of these otherwise fully satisfactory molded pieces of silicon carbide, sometimes unexpected and unforeseeable deviations resulted. It was then recognized that such phenomena, which are inexplicable in themselves, can obviously only occur if the charges contain significant amounts of steel scrap. These phenomena occur particularly in cupola furnaces without a lining. In these special cases, the otherwise fully satisfactory molded pieces of silicon carbide mentioned above do not seem to provide problem-free operation.

SUMMARY OF THE INVENTION

The present invention provides a reliable method for controlling the silicon yield, i.e., while as much as possible avoiding silicon oxidation in cupola furnaces with a lining, even for cast iron melts having a high percentage of steel scrap. Additionally, with the present invention, favorable influence of the melt and particularly the slag and facilitation in reproducing the properties of the cast iron within narrow tolerances are obtained. More particularly, we have found that these results can be obtained by using pressed pieces of silicon carbide containing:

25-60% by weight SiC,
20-50% by weight $Al_2O_3$, $SiO_2$ and CaO (including cement as a binding agent in amounts of 10-25% by weight), having the following portions, computed as oxides
    2-30% by weight $Al_2O_3$,
    7-30% by weight $SiO_2$,
    5-25% by weight CaO,
3-35% by weight graphite,
the remainder being crystalline water and the usual impurities (the percents by weight are each relative to the total weight of the pressed pieces).

These pressed pieces are used as additives to the unlined cupola furnaces for melting of cast iron having a high portion of steel scrap, i.e., approximately 40% by weight and more, relative to the total iron charge. The portion of crystalline water may be, for example, up to 10% by weight.

DESCRIPTION OF THE PREFERRED EMBODIMENT

The improvement in the silicon yield by adding coke slack to pressed pieces of silicon carbide has already been tried. However, satisfactory results were not obtained. This could possibly be due to the fact that, depending on the conditions under which each cupola furnace is operated, a relatively high portion of coke slack burns up in the stack or shaft.

Consequently, the silicon yield varies due to the varying carbon content of the pressed pieces of silicon carbide. In contrast, with the present invention, the consistency of the composition of the pressed pieces of silicon carbide which are added, which pieces are practically unchanged, and particularly the carbon content is controlled. Thus, the invention makes it possible to reliably control the silicon yield at a very high level, and to reproduce the properties of the cast iron. However, it is of special importance that these results can also be obtained when the percentage of steel scrap is high even when the composition of the iron charge varies within a wide range.

Pressed pieces which may contain, aside from graphite, also silicon carbide, are known as described in U.S. Pat. No. 2,540,173. However, this disclosure is not concerned with the problems specific to charges containing high proportions of steel scrap.

In the present invention, a preferred composition for the pressed pieces of silicon carbide comprises:

45-55% by weight SiC,
25-35% by weight $Al_2O_3$, $SiO_2$ and CaO (including cement as a binding agent in amount of 10-25% by weight), having the following portions, computed as oxides:
    2-30% by weigth $Al_2O_3$,
    7-30% by weight $SiO_2$,
    5-25% by weight CaO,
5-25% by weight graphite, with the remainder being crystalline water and the usual impurities.

The graphite referred to herein is of the type having crystals which are visible to the eye or under an optical microscope, i.e., the classical kinds of graphite. Graphite differs from coal in that graphite has an extraordinary resistance to heat and oxidation; and for all practical purposes, graphite does not burn. The graphite used may be synthetic graphite, such as that produced by heating finely crystalline carbon or coke (graphitizing) or natural graphite, for example, graphite from Madagascar, Ceylon, Korea or Mexico. Graphite wastes obtained from electrical and chemical engineering processes may also be used.

The pressed pieces of silicon carbide used in the present invention preferably contain electrode graphite as it is obtained either in the production of graphite electrodes or in the form of unused electrode parts. The electrode graphite is especially suitable probably because it contains a small amount of harmful admixtures, the amount usually being below 2 or even below 1%, and that pitch and tar, particularly pitch and tar from mineral coal are used for the production of the electrodes, which, in turn, are binding agents which contain high amounts of carbon and low amounts of admixtures.

The graphite contained in the pressed pieces of silicon carbide used in the present invention should mainly be made available for the deoxidation of oxidic components, such as, FeO, Fe₂O₃, MnO, to prevent separation of the silicon carbide by, for example, the formation of SiO₂ and its transformation to slag. Furthermore, a satisfactory carbonization is effected and the coke charge can be reduced. The graphite contributes little for thermal purposes, even though the pressed silicon carbide pieces of the present invention can basically still contain mixtures of graphite with other kinds of carbon, or coke slack, the latter usually in insignificant amounts. Another advantage resides in the fact that the formation of aggressive slags is prevented.

The graphite contained in the pressed silicon carbide pieces may have different particle sizes. Frequently, the predominant portion of the graphite has a particle size in the range of 0.1 to 15 mm and preferably of 0.5 to 2 mm.

The pressed pieces of silicon carbide of the present invention may contain additives. However, these should be of such a kind and amount that they have no disadvantageous effects on the melt or the properties of the cast iron. Of the additional substances Al₂O₃, SiO₂, CaO, which are defined as oxides and which may also be present in the form of their compounds, may be present. Calcium is mainly present in a form so that it is effective as a binding agent, namely in the form of cement, even though the presence of the carbonate form is not excluded.

Even though Al₂O₃ and SiO₂ are contained within the cement portion, i.e., in combined form, the presence of additional portions of Al₂O₃ and, particularly, of SiO₂ is desirable. Preferably, these portions are present, at least partially, in the form of ceramic fragments.

It has been found that these additional substances when present in the pressed pieces of silicon carbide are effective additions to cupola furnaces and favorably influence the silicon yield. This could possibly be caused, in part, by a sheathing and diluting effect for the silicon carbide.

Moreover, these additional components contained in the pressed pieces of silicon carbide have a slag-influencing effect. Particularly, the formation of two strongly basic and viscous slags can thus be counteracted.

The pressed pieces of silicon carbide contain, computed in the form of their oxides, 2 to 30% by weight Al₂O₃, 7 to 30% by weight SiO₂ and 5 to 25% by weight CaO, relative to the total weight of the pressed piece. The portion of the cement binding agent is within the total weight of the pressed piece. Iron-Portland cement or Portland cement are preferred, even though the use of Hocholfen-cement (maximum portion of slag=85%) and other less readily available kinds of cement is not excluded.

As a silicon carbide having a high portion of SiC, for example, metallurgical SiC may be present. However, preferred initial materials are silicon carbide having low portions of SiC, for example, the various types of mold fragments or from breakage. As a rule, they already contain known Al₂O₃ and SiO₂ so that by adding Al₂O₃ and SiO₂ and/or cement, the desired portions of these additional components can be adjusted. The Al₂O₃ and/or SiO₂ may be added in the form of wastes and auxiliary materials for burning from the porcelain industry, in the form of corundum, particularly that obtained from breakage of inorganically bound corundum grinding wheels, or in the form of sand, quartz, etc. The addition of other materials which contain Al₂O₃ and SiO₂, for example, basalt, is possible.

The pressed pieces used in the present invention may be shaped in such a manner that the various initial materials, after prior comminuting, can be mixed in the amounts required for adjusting the desired portions of the components. These are homogenized, mixed with water, and then placed in molds from which they are freed after hardening. It is also possible to comminute only the individual components in the mixing and homogenizing stage.

Charges having a portion of steel scrap of, for example, 50% by weight or more, particularly 50 to 80% by weight, relative to the total charge, may be used without disadvantageously influencing the silicon yield. Even with such extremely high portions of steel scrap, it is still possible to reliably and directly obtain a good silicon yield. The same is true accordingly for the use of a highly rusted steel scrap, for example, a charge whose steel scrap portion has a high rust content.

It is understood that the furnaces used in the present method are cupola furnaces without a lining. These are also lined cupola furnaces, the linings of which, after furnace campaigns over several days, have undergone a substantial or total lining oxidation. Of course, the presence of a jacket cooling is a prerequisite for such furnaces.

In the following examples, the compositions of various pressed pieces of silicon carbide in accordance with the present invention and their use are described:

EXAMPLE 1

Pressed Piece Composition

45–55% SiC  15% cement
10–20% graphite  20% CaO, SiO, Al₂O₃

This composition was used for cupola furnaces without a lining which produce iron for medium gray cast iron, GG25 (GG=gray cast iron) or highly carbonized cast iron containing globular graphite, the portion of steel scrap in the charge being 40%.

EXAMPLE 2

Composition of Pressed Pieces

35–45% SiC  20% Cement
10–30% graphite  15% CaO, SiO₂, Al₂O₃

This composition was used for cupola furnaces without a lining which produce iron for medium to heavy gray cast iron, GG25 to GG30, or highly carbonized cast iron containing globular graphite, the portion of steel scrap in the charge being up to 80%.

What is claimed is:

1. In a method for the production of cast iron wherein a charge composed of more than about 40 percent by weight scrap iron is treated in an unlined cupola furnace and molded pieces of a composition containing silicon carbide are added to the charge to siliconize the charge, the improvement which comprises said molded pieces having the following composition:
   25 to 60% by weight SiC,
   20 to 50% by weight Al₂O₃, SiO₂ and CaO (including cement as a binding agent, in amounts of 10 to 25% by weight), having the following portions, computed as oxides
   2 to 30% by weight Al₂O₃,
   7 to 30% by weight SiO₂,
   5 to 25% by weight CaO, 3 to 35% by weight graphite,
all percent weight being based on the total weight of the molded pieces;
with the remainder being water of crystallization and the usual impurities.

2. The process of claim 1 wherein said molded pieces have the following composition
45 to 50% by weight SiC,
25 to 35% by weight $Al_2O_3$, $SiO_2$ and CaO (including cement as a binding agent, in amounts of 10 to 25% by weight), having the following portions, computed as oxides
2 to 30% by weight $Al_2O_3$,
7 to 30% by weight $SiO_2$,
5 to 25% by weight CaO,
5 to 25% by weight graphite,
with the remainder being water of crystallization and the usual impurities.

* * * * *